Dec. 30, 1924.
C. S. TEITSWORTH
1,520,893
SEMIREFRACTORY HEAT INSULATING MATERIAL AND METHOD OF MAKING THE SAME
Filed Dec. 1, 1923
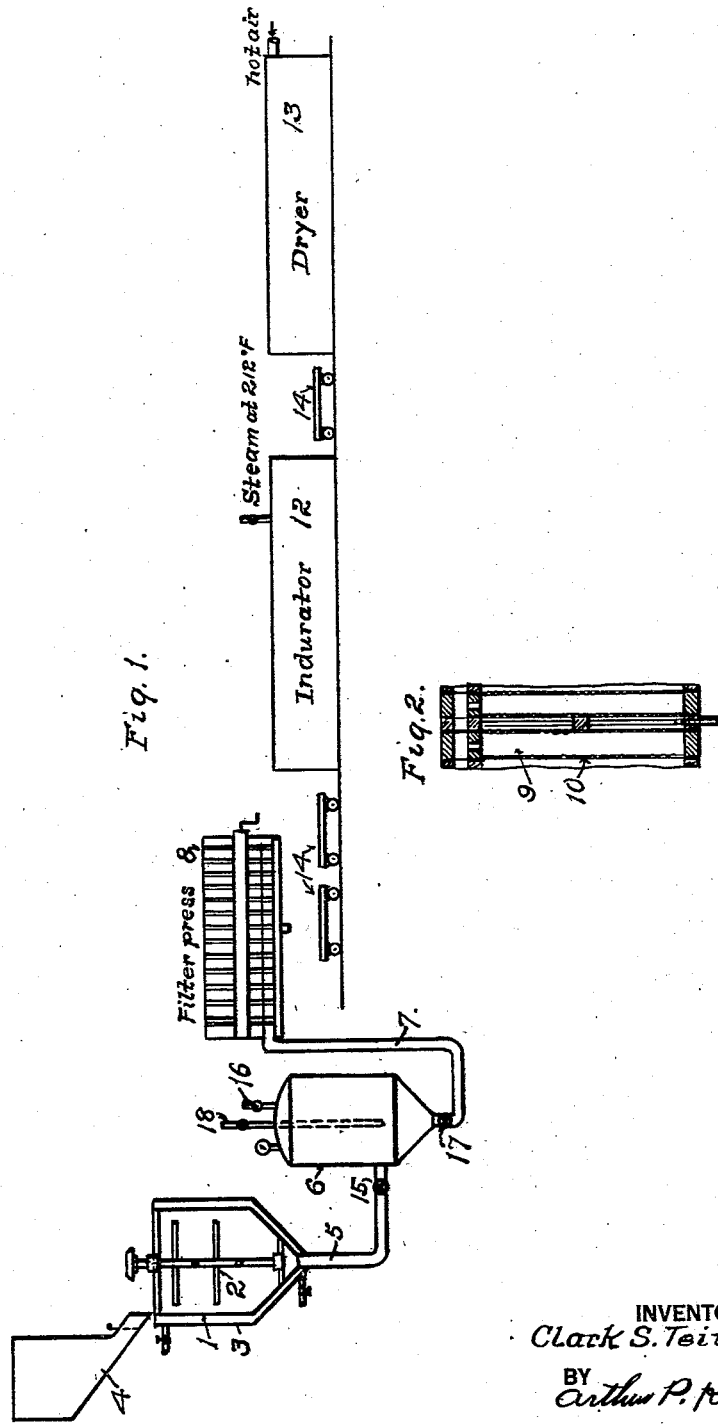
INVENTOR
Clark S. Teitsworth
BY
Arthur P. Knight
ATTORNEY Patented Dec. 30, 1924.

1,520,893

UNITED STATES PATENT OFFICE.

CLARK S. TEITSWORTH, OF LOMPOC, CALIFORNIA, ASSIGNOR TO THE CELITE COMPANY, OF LOS ANGELES, CALIFORNIA, A CORPORATION OF DELAWARE.

SEMIREFRACTORY HEAT INSULATING MATERIAL AND METHOD OF MAKING THE SAME.

Application filed December 1, 1923. Serial No. 678,030.

*To all whom it may concern:*

Be it known that I, CLARK S. TEITSWORTH, a citizen of the United States, residing at Lompoc, county of Santa Barbara, and State of California, have invented a new and useful Improvement in Semirefractory Heat Insulating Materials and Methods of Making the Same, of which the following is a specification.

This invention pertains to methods of manufacturing an engineering construction material having refractory and heat insulating properties and at the same time those qualities which give permanency, light weight, and freedom from disintegration, shrinkage and spalling at high temperatures.

Of the many materials used in the manufacturing of heat insulating compositions, magnesium carbonate and diatomaceous earth have been the most generally adopted. Compositions containing magnesium carbonate have several disadvantages, namely, the block or form made therefrom shrinks and checks badly at temperatures above 1000° F. so that almost complete disintegration takes place. This is due to the liberation of carbon dioxide from the carbonate. Diatomaceous earth, however is the most efficient heat resisting and insulating material in the natural state which has yet been found and many methods of binding the particles of the earth so as to give the desired strength without reducing the heat insulating properties have been tried and abandoned as unsuccessful.

The present invention is an important improvement upon the art in that I have devised a method of manufacture by which a very small amount of binder produces a material having great natural strength and cohesion and at the same time better heat insulation ability than the natural diatomaceous earth in compacted state.

It has been well-known that silica and lime in the presence of steam at a pressure of approximately 150 pounds, will combine to form calcium silicate resulting in hard and horny mass, having a high crushing strength. My present invention obviates the use of high pressures and forms calcium silicate at atmospheric pressure which binds and holds together the particles of diatomaceous earth without destroying their structure or impairing their value as heat insulators.

The accompanying drawings illustrate an apparatus suitable for carrying out my invention in its preferred form, and referring thereto:

Fig. 1 is a diagrammatic elevation of such apparatus.

Fig. 2 is a horizontal section of two of the filter molds, or frames with the intervening plate.

The apparatus shown in the drawings comprises an agitator, or mixing tank 1, provided with mixing arms 2 operated by any suitable means and further provided if necessary with a steam jacket 3 for heating the same. A means indicated at 4 is provided for feeding to the tank 1 the composition to be mixed. Tank 1 is provided at its bottom with an outlet 5 leading to suitable forcing means, for example, an air pressure tank or monte-jus 6 which is adapted to force the mixture through a pipe 7 to a filter press or apparatus 8. Said filter press may be of the usual plate and frame type, being constructed of removable forms having permeable membranes which retain the particles and fibrous material which compose the block or shape formed in the filter press. These forms may vary in size and are easily set up. The frames are made of dimensions corresponding to the block of composition which is to be formed and each frame 9 with its permeable walls indicated at 10 in Fig. 2 forms a filter mold. The apparatus further comprises an indurating or hardening kiln or chamber indicated at 12 and a drying chamber indicated at 13. Suitable cars 14 and track means therefor may be provided for conducting the blocks gradually through said indurating kiln and then through said drying chamber. The air pressure tank 6 may be provided with air supply means 18 for maintaining air pressure therein and for agitating the mixture. By opening valve 15 in the outlet of tank 1 and also opening air exhaust valve 16 for pressure tank 6, the mixture may be discharged from tank 1 into tank 6 and then by closing valves 15 and 16 and opening a valve 17 in pipe 7, the mixture may be forced by air pressure to the filter press 8.

The composition which I have found suitable in many cases consists of 75% by weight of finely divided or disintegrated diatomaceous earth, 15% lime, and 10% asbestos fiber. The finely divided diatomaceous earth, quick lime, and fiber are thoroughly agitated in form 8 to 12 parts by weight, of water which has been warmed up originally to about 120° F. and in addition has been heated by the reaction of the quicklime upon hydrating. Upon agitating the required amount of time, usually not over two hours, the slurry is forced by air pressure or other suitable means into a filter press containing forms having the exact dimensions of the desired finished block. Pressures of not over 25 lbs. per sq. in. are used in filtering the slurry and after the forms are filled the blocks are removed, placed upon steel drier cars or pallets and indurated in a steam chamber at a temperature of about 212° F. and at atmospheric pressure for a period of three to six hours. The blocks are then passed through a tunnel or drier having a maximum temperature of not over 500° F. and all excess moisture driven off. This process produces blocks varying in density from 15 to 22 lbs. per cubic foot.

That feature of my invention which consists in mixing the lime, diatomaceous earth, fiber, and water and warming for a short time before charging to the filter press is highly important. If the mixture is made in the cold and not warmed before filtering out the excess water, the cakes formed in the press are dense and give a heavy block on drying. If, on the other hand, a part of the lime is combined with the silica, by warming previous to filter-pressing, there is caused sufficient swelling of the mass to give lighter filter cakes and a less dense product after drying such cakes. By this invention, it is possible to control at will, within rather wide limits, the density (and consequently the insulating power) of the product, by simply choosing a suitable period of time for the reaction of lime and diatomaceous earth in the hot mix, previous to shaping in the filter press. The same process of preliminary swelling may be used also, if the shaping is to be done by simply pouring into molds. In any case, the final set is induced after shaping, by maintaining the mass at an elevated temperature, as in the steaming chamber described below, for several hours.

The indurating operation above referred to is carried on in the presence of steam at substantially atmospheric pressure and of a temperature of about 212° F., the indurating chamber or kiln 12 being formed, for example, as a tunnel kiln and provided with means for closure at the ends thereof by doors or the like so as to retain the heat and steam within the kiln but without confining the steam so as to produce any superatmospheric pressure. For convenience the blocks or slabs formed in the filter press may be placed on cars which are passed through the indurating kiln and the drier so that the blocks are first subjected to an indurating or hardening operation and then dried to any desired extent.

It has been possible for me to manufacture blocks of various sizes for heat insulating purposes by the use of the above described equipment which were lighter in weight, gave a higher resistance to heat flow and remained more constant under extreme heat conditions than any other blocks now found on the market. Upon testing these blocks they showed almost absolute freedom from carbon dioxide or carbonates and after exposure to 1600° F. showed a shrinkage of only a little over 1%. Their heat conductivity was below that of diatomaceous earth found in its natural state.

As an alternative method of manufacture, I may place the required amount of diatomaceous earth in the kettle or agitator 1, add thereto from 3 to 4½ parts of water and after thoroughly agitating, feed in slowly 15% by weight, of quick lime in a finely divided condition; 10% asbestos fiber is then added and the agitation continued until a homogenous mass is obtained, usually not over an hour being required for the entire operation. This mass is then poured into molds, trowelled over the surface to give a smooth finish and the filled molds placed in a chamber filled with steam so that although no pressure is exerted, a temperature of 212° F. is maintained. This curing process is continued for 8 hours and the blocks then removed from molds, trimmed or sawed to size and placed in a drying oven or tunnel, where all excess moisture is driven off. The resultant block may vary from 12 to 17 lbs. per cubic foot in weight and may be used for heat insulating of all high temperature equipment.

Although quicklime in a finely divided condition has been found to be more reactive, and under one form of operation has produced blocks having a higher crushing strength than those made by the use of hydrated lime, I do not wish to limit my invention to the use of lime in the form of an oxide alone.

The asbestos fiber used in this composition gives the blocks an added degree of strength at low temperatures, that is temperatures which do not exceed 1000° F., but above this limit the fibers are greatly weakened and practically burned out at 1400° F. At this temperature, however, the blocks develop some strength by the action of heat upon the particles of diatomaceous earth and calcium hydro-silicate, so that there is no disintegration or weakening when the blocks are used in furnace walls subjected to very high temperatures. This is a very desirable property which is not found in any of the light weight blocks now on the market, as this makes it possible to reuse the blocks whenever a furnace is torn down. For work which does not require a block which has refractory properties, as well as small thermal conductivity, as for instance in the insulation of refrigerators, low pressure steam drums, sweating temperatures, etc., the use of asbestos fiber may be dispensed with and a cheap manila or cellulose fiber substituted therefor.

Moreover, for low temperature work I have found it desirable to waterproof, or coat the blocks so as to make them water repellent. This may be accomplished in many ways, with a great many substitutes, either by treating the uncombined particles of diatomaceous earth, or the finished block, and since the method of waterproofing is well-known, it is unnecessary for me to describe this operation in detail.

For some work where large blocks of insulating construction material are desirable, such as insulation of oil or gasoline storage tanks, I have found that the insertion of a strip of wire mesh through the center of the block adds materially to its strength, it is then possible to bend a block in order to make it follow the contours of a tank or other equipment, without the formation of cracks or breakage of the block. Bending may be facilitated by sawing a kerf or multiplicity thereof in the concave side of a block so as to take care of the compression of the material forming the block. In forming such reinforced blocks by the filter mold method, the wire mesh is suspended in the center of the forms and the block built up around it. Blocks may also be molded only half the thickness being poured first the wire mesh laid on and the second half poured on top.

In using the monte-jus or pressure tank shown at 6 in Fig. 1 either steam or air may be used for producing pressure and agitation, the said device operating as an air or steam agitator by introducing the air or steam at the bottom of the tank, possibly by extension of the air inlet from the top. When filling the press, pressure is built up in the tank to the desired value, the thin slurry being agitated in the tank while the press is being filled.

What I claim is:

1. The method of making a heat insulating composition which consists in subjecting a mixture comprising diatomaceous earth and lime to the action of heat and agitation in the presence of water, then molding the mixture to desired shape and subjecting the molded material to the action of steam at substantially atmospheric pressure to indurate the material and subjecting the indurated material to a drying operation.

2. The method of making a heat insulating composition which consists in subjecting a mixture comprising diatomaceous earth and lime together with water to the action of heat and agitation at a sufficient temperature and for a sufficient time to cause an increase in volume of the solid material and to cause partial reaction between the lime and diatomaceous earth to form a voluminous calcium silicate, molding the material so produced to desired shape, subjecting the molded material to induration to complete the reaction between the lime and the diatomaceous earth, resulting in the formation of calcium silicate and then drying the molded and indurated material.

3. A process as set forth in claim 2 in which the induration is effected by subjecting the material to the action of steam at substantially atmospheric pressure and at a temperature of approximately 212° F.

4. The method of making a heat insulating composition which consists in mixing diatomaceous earth, quick lime, and water, subjecting the mixture to a cooking operation by the action of heat and agitation, to cause a permanent increase in volume of the solid material thereof, and partial formation of calcium silicate, such heat being produced in part by the slaking of the quicklime, then molding the resulting product, subjecting the molded material to induration to complete the action between the diatomaceous earth and lime to form calcium silicate, and then drying the molded indurated material.

5. The method of making a heat insulating composition which consists in mixing diatomaceous earth, lime, and fibrous material, subjecting the mixture to a cooking operation by the action of heat and agitation in the presence of water to cause a permanent increase in volume of the solid material thereof and partial combination of the lime and silica, then molding the resulting product, subjecting the molded material to induration to complete the reaction between the diatomaceous earth and lime, and then drying the molded indurated material.

6. A method of making heat insulating bodies which consists in mixing 75 per cent of finely divided diatomaceous earth, 15 per cent crushed quicklime and 10 per cent fibrous material by weight, subjecting the mixture to a cooking operation by the action of heat and agitation in the presence of water to cause a permanent increase in volume of the solid material thereof and partial combination of the lime and diatomaceous earth, then molding the resulting product, subjecting the molded material to induration to complete the reaction between the diatomaceous earth and lime and then drying the molded indurated product.

7. A heat insulating composition consisting of the product of mixing diatomaceous earth, lime, and fibrous material, subjecting the mixture to a cooking operation by the action of heat and agitation in the presence of water to cause a permanent increase in volume of the solid material thereof and partial combination of the lime and silica, then molding the resulting product, subjecting the molded material to induration to complete the reaction between the diatomaceous earth and lime, and then drying the molded indurated material.

In testimony whereof I have hereunto subscribed my name this 19th day of November 1923.

CLARK S. TEITSWORTH.